United States Patent
Bedetti (10) Patent No.: US 7,048,772 B1
(45) Date of Patent: May 23, 2006

(54) SECONDARY REFORMING PROCESS AND BURNER

(75) Inventor: Gianfranco Bedetti, Milan (IT)

(73) Assignee: Casale Chemicals S.A., Lugano-Besso (CH)

( * ) Notice: Subject to any disclaimer, the term of this patent is extended or adjusted under 35 U.S.C. 154(b) by 0 days.

(21) Appl. No.: 09/913,314

(22) PCT Filed: Feb. 10, 2000

(86) PCT No.: PCT/IB00/00145

§ 371 (c)(1),
(2), (4) Date: Dec. 21, 2001

(87) PCT Pub. No.: WO00/47517

PCT Pub. Date: Aug. 17, 2000

Related U.S. Application Data (60) Provisional application No. 60/119,793, filed on Feb. 11, 1999.

(30) Foreign Application Priority Data

Feb. 10, 1999  (EP) .................................. 99200369

(51) Int. Cl.
*C01B 3/32* (2006.01)

(52) U.S. Cl. .................... 48/198.8; 48/127.5; 48/127.9; 48/189.4; 48/214 A; 48/197 FM; 422/198; 422/219

(58) Field of Classification Search .............. 48/197 R, 48/127.9, 189.4, 198.8, 214 A, 197 FM, 48/127.5; 422/198, 219; 239/127.3, 132.3
See application file for complete search history.

(56) References Cited

U.S. PATENT DOCUMENTS

| | | | |
|---|---|---|---|
| 3,945,942 A | | 3/1976 | Marion et al. |
| 4,166,834 A | * | 9/1979 | Reed et al. ................... 422/148 |
| 4,902,484 A | * | 2/1990 | Martin et al. ................ 422/189 |
| 5,549,877 A | * | 8/1996 | Gateau et al. ............ 423/245.3 |

(Continued)

FOREIGN PATENT DOCUMENTS

EP  0 959 120 A1  11/1999

OTHER PUBLICATIONS

"Refining Reforming Technology" Nitrogen, GB, British Sulphur Co., London, No. 214, Mar. 1, 1995, pp. 38, 40-46,48-, XP000502771 ISSN: 029-0777.

(Continued)

*Primary Examiner*—N. Bhat
(74) *Attorney, Agent, or Firm*—Sughrue Mion, PLLC (57) ABSTRACT

A process for carrying out secondary reforming reactions for the production of synthesis gas wherein a gas flow comprising oxygen and a gas flow comprising hydrocarbons are fed into a combustion chamber and are reacted upon mixing, thus obtaining a gas flow comprising hydrogen and carbon monoxide fed in turn to a catalytic bed for carrying out a steam reforming reaction, is distinguished in that it comprises the steps of:—feeding the gas flow comprising oxygen in the combustion chamber in the form of a plurality of jets not laid the one upon the other with respect to the direction of the flow comprising hydrocarbons and generated by corresponding parallel streamtubes having equal velocity;—splitting the plurality of jets within the gas flow comprising hydrocarbons in the combustion chamber so as to mix the gas flow comprising oxygen with amounts of gas flow comprising hydrocarbons at local constant ratio.

17 Claims, 3 Drawing Sheets

U.S. PATENT DOCUMENTS 5,980,596 A * 11/1999 Hershkowitz et al. ..... 48/127.9

OTHER PUBLICATIONS

Thomas S. Christensen et al.: "Design and Performance of Secondary and Autothermal Reforming Burners" Ammonia Plant Safety & Related Facilities, vol. 34, 1994, pp. 205-215, XP000913993 New York.

Baade, W. F. et al.: "Generate Hydrogen for Reformulated Gasoline and Clean Diesel Requirements. \Oxygen Secondary Reforming Adds H2 Capacity Without Increased NOX and SOX Emissions" Hydrocarbon Porcessing, US, Gulf Publishing Co. Houston, vol. 72, No. 1, Jan. 1, 1993, pp. 77-80, 82, 84-, XP000332536 ISSN: 0018-8190.

* cited by examiner

SECONDARY REFORMING PROCESS AND BURNER

This application is a 371 of PCT/IB00/00145 filed Feb. 10, 2000, which is a CIP of U.S. Provisional Application 60/119,793 filed Feb. 11, 1999.

FIELD OF APPLICATION

The present invention relates to a process for carrying out secondary reforming reactions for the production of gas mixtures containing hydrogen and carbon monoxide, such as for example the synthesis gases for ammonia and methanol.

Precisely, the present invention focuses on the exothermic combustion reaction that precedes the strongly endothermic steam reforming catalytic reaction.

In particular, the present invention concerns a process for secondary reforming comprising the steps of:
- feeding a gas flow comprising oxygen into a combustion chamber through a feeding duct of a burner;
- feeding a gas flow comprising hydrocarbons in the combustion chamber through a substantially annular passage defined externally to the feeding duct;
- mixing and reacting the gas flow comprising oxygen with the gas flow comprising hydrocarbons, obtaining a gas flow comprising hydrogen and carbon monoxide;
- feeding the gas flow comprising hydrogen and carbon monoxide to a catalytic bed which lays below the combustion chamber for carrying out a steam reforming reaction.

In the following description and in the attached claims, the term: "gas flow comprising oxygen", is used to generically indicate a comburent gas comprising in addition to oxygen also steam and in case nitrogen; instead, the term: "gas flow comprising hydrocarbons", is used for indicating a combustible or process gas comprising hydrogen, carbon monoxide, carbon dioxide and steam beside light hydrocarbons (for example C1–C4).

The combustible gas generally derives from a section of primary reforming wherein hydrocarbons like for example natural gas, naphtha, LPG (liquefied petroleum gas) or refinery gas, and mixtures thereof, are reacted with water steam. In the field these gases are also called transformed or reformed gases.

In the following description and in the attached claims, the term: "gas flow comprising hydrogen and carbon monoxide" is used for indicating a gas flow comprising also $N_2$, Ar and He beside CO and $H_2$.

The invention also relates to a burner for carrying out the above-mentioned process.

As known, in the field of synthesis gas production, the need for a process for carrying out secondary reforming reactions with high yields, which is easy to be implemented and implying reduced energy consumption and low operating costs, is more and more felt.

PRIOR ART

In order to comply with such requirement, processes have been proposed in the field wherein the combustion reaction is made occur by mixing oxygen with a gas flow comprising hydrocarbons, in general transformed gas deriving from a primary reforming section, in a combustion chamber.

In particular, according to these processes, the oxygen flow fed to the combustion chamber is split in a plurality of jets that depart radially in rows generally laid the one upon the other from a circular collector, whereas the hydrocarbons flow is made flow through these jets.

In doing so, a plurality of radial flames are formed (a respective one for each jet), that are generally distributed in circular rows laid the one upon the other with respect to the direction of the process gas flow, and hence the combustion of a remarkable amount of process gas may take place even in a reduced space such as that of the combustion chamber.

In fact, it may be useful to recall that in apparatuses for secondary reforming, the combustion chamber wherein the combustion of the hydrocarbons takes place, is provided in the space defined above a catalytic bed for the next steam reforming reaction of the burnt gas comprising carbon monoxide and hydrogen.

This is due to the fact that, in order to optimise the yield of such apparatus, the space taken by the catalyst is maximised, thereby limiting the space where the combustion reaction of the process gas shall take place.

Notwithstanding the fact that the split of the oxygen flow in a plurality of rows of jets laid the one upon the other and oriented in a semi-radial direction enhances the combustion of the hydrocarbons in a reduced space, the processes according to the prior art have various drawbacks that are hereinbelow highlighted.

The plurality of radial jets distributed in circular rows laid the one upon the other with respect to the flow direction of the hydrocarbons, is the main cause of a non optimal mixing of the reagent gases, also with the burnt gas, in the combustion chamber. This has the consequence of a non-homogeneous combustion, which worsen the yield of the subsequent steam reforming reaction to the detriment of the synthesis gas production.

This drawback is mainly due to the non-optimal positioning and dimensioning of the oxygen jets that thus intake different quantities of process gas, and burnt gas, with the subsequent formation of different flames, i.e. at different temperature and composition conditions.

Further on, this phenomenon may be further emphasised in the processes according to the prior art by a non-uniform flow rate of the gas flow comprising hydrocarbons which is fed in the combustion chamber near the oxygen jets.

Excessive length of the flames generated by the oxygen jets fed in the combustion chamber, due to the far from optimal dimensioning of such jets, i.e. due to an inadequate number of jets and to an excessive diameter of the nozzles that generate such jets.

The length of the flames is a critical parameter for an optimal exploitation of the combustion chamber. Too long flames may lap onto the lining of refractory material of the combustion chamber as well as onto the underlying catalyst, thus damaging both.

Because of the excessive length of the flames, in the apparatus for secondary reforming intended for carrying out the processes according to the prior art, it is necessary to change with a relatively high frequency the refractory material of the combustion chamber with subsequent high costs of maintenance and production losses. Further on, in order to avoid damages to the catalyst, part of the space destined to the catalyst bed is sacrificed to the detriment of the global yield of such apparatus for the production of synthesis gas.

High pressure drop of the oxygen flow, that, beside being used as comburent in the combustion reaction, is very important as coolant of the walls of the burner intended for carrying out the combustion reaction, with the purpose of avoiding damages or rapid deterioration thereof.

According to the processes of the prior art, the comburent gas is made flow along specific paths in order to realise the aforesaid cooling with the consequence, however, of a high pressure drop of such flow, with negative consequences in terms of energy consumption and operating costs.

Because of these drawbacks, the implementation of processes for carrying out secondary reforming reactions according to the prior art requires to date high energy consumption as well as high operating and maintenance costs, such that the costs for the production of synthesis gas are remarkably penalised.

SUMMARY OF THE INVENTION

The technical problem at the basis of the present invention is that of providing a process for carrying out secondary reforming reactions, with a high yield, which is easy to carry out and does not require high operating and maintenance costs.

According to the present invention, the aforesaid problem is solved by a process of the above indicated type, which is characterized in that it comprises the further steps of:

- feeding the gas flow comprising oxygen in the combustion chamber as a plurality of jets which are not laid the one upon the other with respect to the direction of the flow comprising hydrocarbons and are generated from corresponding parallel streamtubes having equal velocity;
- splitting the plurality of jets within the hydrocarbon gaseous flow in the combustion chamber so as to mix the gaseous flow comprising oxygen with amounts of gaseous flow comprising hydrocarbon at local constant ratio.

Advantageously, the present invention allows to optimise the combustion reaction of the hydrocarbons, and therefore to facilitate the production of synthesis gas, minimising the energy consumption and the operating and maintenance costs.

In fact, thanks to the present process, the gas flow comprising oxygen fed into the combustion chamber is split in a plurality of jets not laid the one upon the other in the direction of the gas flow comprising hydrocarbons. In other words, each portion of flow comprising hydrocarbons directed into the combustion chamber contacts only one jet of oxygen and not a plurality of jets as is generally the case in the processes according to the prior art.

Further on, such jets are split within the hydrocarbon gaseous flow so as to mix the gaseous flow comprising oxygen with amounts of gaseous flow comprising hydrocarbon in local constant ratio.

This enables each oxygen jet to intake in the combustion chamber a constant amount of combustible gas and possibly recycled burnt gas, with the result that flames are obtained all at the same temperature and composition conditions.

In other words, it is possible to optimize the mixing between the gaseous reactants obtaining equal flames and thus a constant and homogeneous combustion in all the combustion chamber.

This enhances the completion of the combustion reaction to the advantage of the energy consumption and of the yield of the subsequent steam reforming catalytic reaction.

Moreover, thanks to the total absence of jets laid the one upon the other and to the fact of generating such jets from corresponding parallel streamtube having equal velocity, the end portion of the feeding duct, which is in contact with the hot burnt gases and hence in general subjected to a rapid deterioration, can be cooled effectively and uniformly by all the oxygen flow rate, that is by a constant and homogeneous amount of oxygen that flows inside it. In this way it is possible to guarantee a long operating life of the feeding duct (of the burner for the combustion of the process gas), avoiding therefore a frequent replacement of the same, that requires the plant shut-down, with ensuing relevant savings in terms of economics and production losses.

Finally, the process according to the present invention is very simple, extremely reliable and of easy implementation, without implying high capital investments or maintenance costs.

The development of a process for carrying out secondary reforming reactions for the production of synthesis gas able to overcome the above mentioned drawbacks with reference to the prior art has been possible only thanks to the researches carried out by the applicant.

Preferably, the gas flow comprising oxygen crosses the gas flow comprising hydrocarbons within the combustion chamber with a substantially transversal motion.

In this way an optimal circulation of the burnt gases inside the combustion chamber is achieved, which are suitably entrained by the oxygen jets and supply the sufficient energy for igniting the flame.

Advantageously, the energy consumption is further reduced subjecting the gas flow comprising oxygen passing through the feeding duct to an overall pressure drop comprised between 0,25 and 0,35 bar.

Preferably, the jets of the gas flow comprising oxygen are fed into the combustion chamber with substantial orthogonal motion with respect to the direction of such flow inside the feeding duct.

In this way, the formation of jets, which are uniform and constant in time, is made easy, thus further enhancing the mixing with the hydrocarbons and the following combustion reaction.

Further on, an even more efficient cooling is achieved at the end portion of the feeding duct that is subjected to greater heat stresses.

According to a further aspect of the invention, a burner is also provided for secondary reforming of the type comprising:

- a substantially cylindrical duct of predetermined length for feeding a gas flow comprising oxygen to a combustion chamber beneath the burner;

characterized in that it further comprises:

- at least one collector for the gas flow comprising oxygen in fluid communication with an end of the duct of the burner, comprising a plurality of nozzles distributed along a perimeter of such at least one collector near a lower end thereof and arranged so as not to lay the one upon the other with respect to the direction orthogonal to such lower end of said at least one collector.

Further features and advantages of the present invention will appear more clearly from the following indicative and non-limiting description of an embodiment of the present process, made with reference to the attached drawings.

DETAILED DESCRIPTION OF A PREFERRED EMBODIMENT

Figure 1:
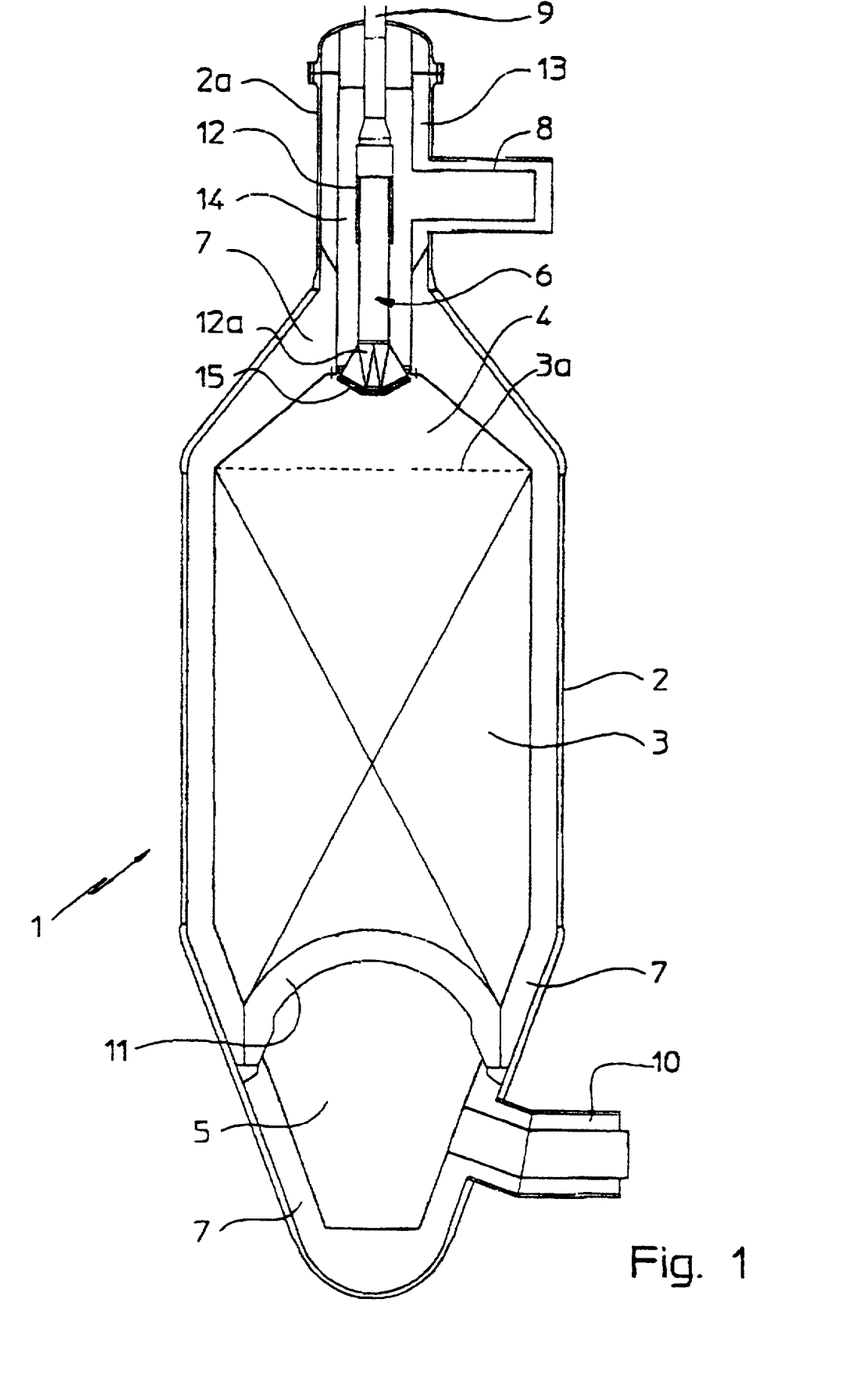
FIG. 1 shows a schematic view in longitudinal section of a secondary reforming apparatus for the production of synthesis gas comprising a burner unit operating with the process according to a preferred embodiment of the present invention.

With reference to FIG. 1, with 1 there is indicated in general a secondary reforming apparatus of the type comprising a substantially cylindrical shell 2 wherein a catalyst bed 3 is arranged for carrying out reactions such as the steam reforming reaction for the production of synthesis gas.

At an upper and lower end of the shell 2, generally in the form of a truncated cone, there is further defined a combustion chamber 4 for the combustion of the hydrocarbons and a chamber 5 for collecting the synthesis gas produced in the catalytic bed 3, respectively.

In particular, the combustion chamber 4 wherein the combustion reaction between the oxygen and the hydrocarbons takes place is delimited below by the maximum level reached by the catalyst inside the shell 2, indicated in FIG. 1 by the dashed line 3a, and above by a burner 6 that will be described hereinbelow in greater detail.

The inside of the shell 2 is lined with refractory material—indicated in general with 7 in FIG. 1—resistant to high temperatures, as protection for the metallic structure of the shell.

The gas flow comprising hydrocarbons coming in general from the primary reforming section is introduced into the apparatus 1 through the gas inlet nozzle 8.

The gas flow comprising oxygen, is instead introduced into the apparatus 1 through the nozzle gas inlet 9. This flow called also comburent gas comprises in general air or air enriched in oxygen. The term: "air enriched in oxygen", is meant to indicate air with an oxygen content higher than 21% molar, for example comprised between 22% and 80%.

The synthesis gas resulting from the steam reforming catalytic reaction exits the apparatus 1 through the gas outlet nozzle 10 in fluid communication with the chamber 5.

With 11 there is finally indicated a hemispherical cap element for supporting the catalytic bed 3 of the shell 2.

The secondary reforming apparatus 1 of FIG. 1 generally operates at temperatures comprised between 800–1000° C., and pressures comprised between 20–40 bar. In the field, this apparatus is also called autothermal reforming apparatus.

The materials and the catalyst used in secondary reformer apparatus 1 are of conventional type and will not be described in greater detail in the following description.

The burner 6 in FIG. 1 is housed in an upper appendix 2a of the shell 2 of a smaller diameter than the latter.

It comprises a first duct 12, substantially cylindrical and of predetermined length, which is in fluid communication with the inlet nozzle 9 for feeding the gas flow comprising oxygen to the underlying combustion chamber 4.

A second duct 13, external and coaxial with respect to the burner 6, provided in the appendix 2a of the shell 2, defines inside it—between the ducts 12 and 13—a substantially annular hollow space 14 for feeding the gas flow comprising hydrocarbons to the combustion chamber 4.

The hollow space 14 is in fluid communication with the inlet nozzle 8 that leads into the second duct 13 in orthogonal direction thereto.

The burner 6 according to the present invention further comprises at least one collector 15 for the gas flow comprising oxygen in fluid communication with an end 12a of the first duct 12.

Figure 2:
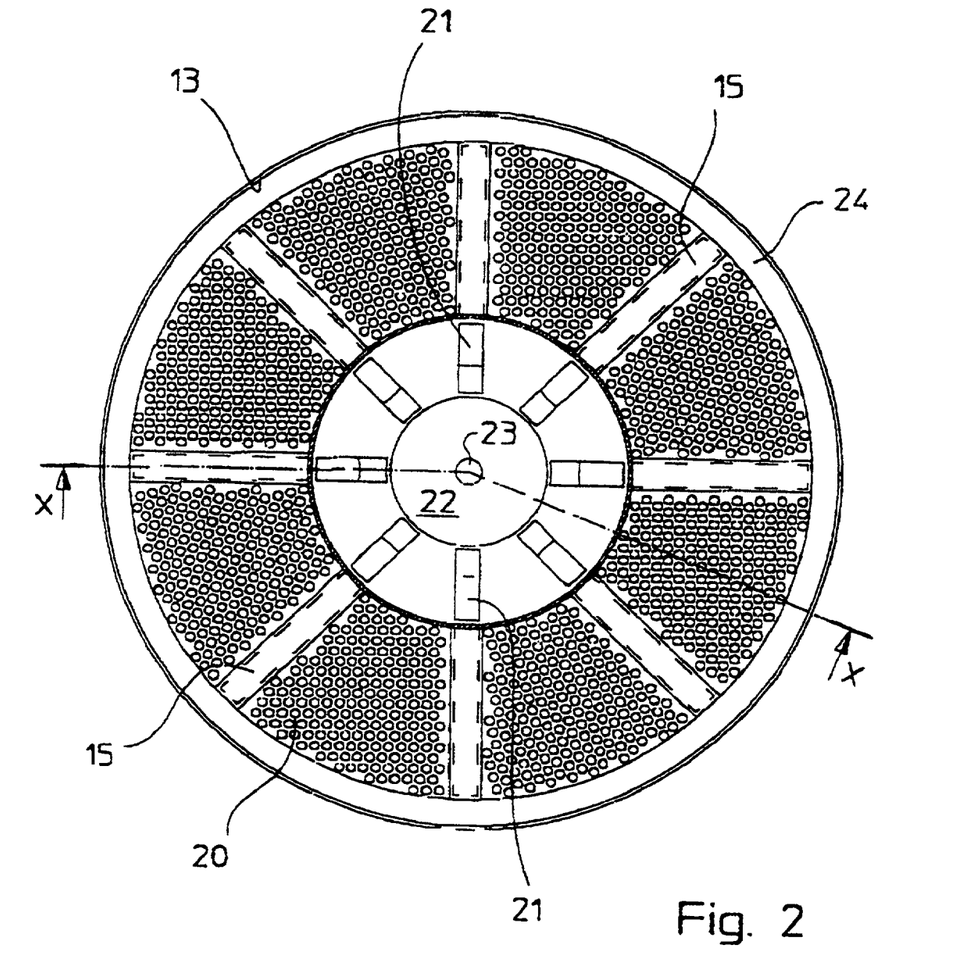
FIG. 2 shows a schematic view in cross section of the burner unit shown in FIG. 1, according to a preferred embodiment of the present invention.
Figure 3:
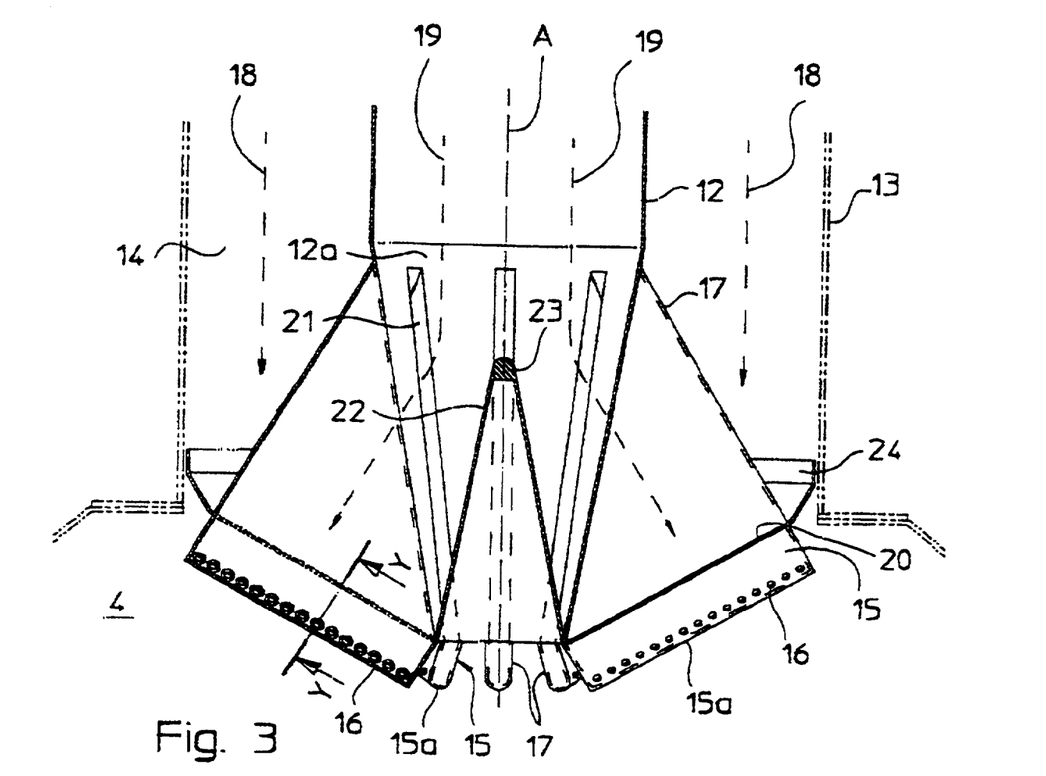
FIG. 3 shows a schematic view in longitudinal section of the burner unit of FIG. 2, taken along line X—X.
Figure 4:
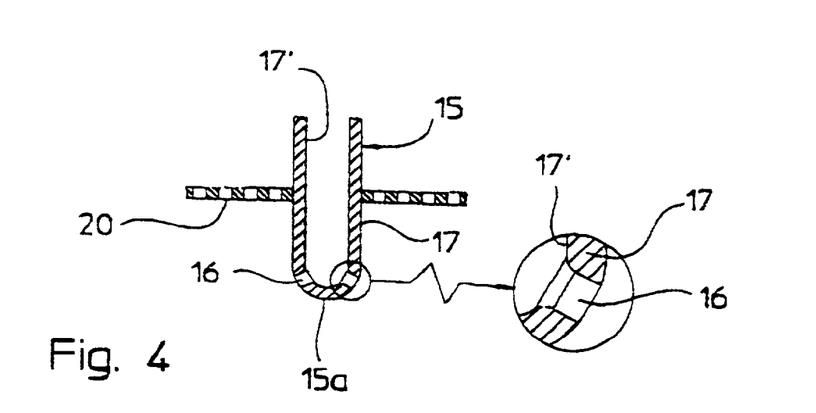
FIG. 4 shows a schematic view in longitudinal section of a detail of the burner unit of FIG. 3, taken along line Y—Y.

According to a preferred embodiment of the present invention, represented in greater detail in FIGS. 2–4, the burner 6 comprises a plurality of collectors 15 that extend radially from the end 12a of the first duct 12.

Preferably, the number of collectors 15 can vary from 4 to 12, according to the flow rate of the reactant gases and to the space available in the combustion chamber 4. In the example illustrated here, the burner 6 comprises eight collectors 15 that extend radially along the circumference of the first duct 12 and at the same distance with respect to each other.

Advantageously, the collectors 15 comprise in turn a plurality of nozzles 16 distributed along the circumference of the collectors 15 near to a lower end 15a thereof and arranged so as not to lay one upon the other with respect to the direction orthogonal to the end 15a of collectors 15.

In this specific example, the nozzles 16 are distributed along opposite walls 17 of the collectors 15.

In FIGS. 2–4, the details of the burner 6 equivalent for structure and operation to those illustrated in FIG. 1 will be indicated with the same reference numerals and will not be described again.

Thanks to the particular arrangement of the nozzles 16 along the walls 17 of the collectors 15, a considerable improvement with respect to the prior art of the mixing and therefore also of the combustion of the reactant gases in the combustion chamber 14 may be advantageously achieved.

In fact, in doing so, each portion of the gas flow comprising hydrocarbons coming from the hollow space 14 that leads into the combustion chamber 4 in a mainly axial direction, as indicated by the dashed flow line 18 in FIG. 3, is entrained, that is to say is mixed with only one jet of the gas flow comprising oxygen resulting from the passage of the comburent gas through the nozzles 16 of the collectors 15.

The same applies to the flow of burnt gases (not shown) circulating in the combustion chamber 4. In this instance as well, each portion of the burnt gas flowing near the burner 7 is entrained by only one jet of comburent gas.

The burner 6 according to the present invention permits therefore to obtain almost constant mixing conditions at the collectors 15, which means working with flames all equal to each other and operating at the same temperature and composition conditions.

Particularly satisfying results, in terms of mixing between the reactant gases, have been obtained arranging the nozzles 16 in only one line, preferably parallel to the lower end 15a of the collectors 15, as shown in the embodiment of FIG. 3.

In this respect, it is important to observe that the radial arrangement of a plurality of collectors 15 in fluid communication with the end 12a of the first duct 12 allows to obtain an optimal exploitation of the little space available in the combustion chamber 4.

This arrangement of collectors 15 permits to have a great number of nozzles 16 of little diameter not laid the one upon the other with respect to the direction orthogonal to the end 15a of collectors 15. It follows that is possible to obtain a number of flames (one for each oxygen jet) such to enable the completion of the combustion reaction inside the combustion chamber 4. At the same time, these flames are short enough to avoid any damage of the catalyst below the combustion chamber 4 or of the inner walls of this chamber.

In the example shown, the nozzles 16 are of circular shape. It is however possible to manufacture the nozzles 16 with different shape, for instance of substantially rectangular shape so as to obtain a plurality of adjacent slots.

The nozzles 16 are advantageously disposed along the perimeter of the collectors 15 at changing distance so as to maintain a constant mixing ratio between the gaseous flow comprising oxygen and the gaseous flow comprising hydrocarbons in each zone of the combustion chamber 4 facing the burner 6. Thus ensuring homogeneous combustion conditions along the entire radius of the collectors 15. In case of circular nozzles 16, such distance is advantageously determined according to the following relationship:

$$Ni*Di^2/(Ri*DR)=C$$

Wherein, C is a constant, Ri the radius of an i-th circumference passing through the nozzles, Ni the number of nozzles on the circumference with radius Ri, Di the diameter of the nozzles on the circumference with radius Ri, and the radial distance $DR=(R_{i+}1-R_{i-}1)/2$.

The radius Ri is equal to the distance between the axis A of the duct 12 and the nozzles 16 arranged on the i-th circumference.

Analogous criteria may be used in case of non-circular nozzles 16.

In doing so, the nozzles 16 can be suitably spaced apart so to ensure an optimal combustion in the chamber 4 and—among others—avoid undesired intersections or disturbances between adjacent jets, i.e. adjacent flames.

Particularly advantageous results have been obtained providing a radial distance DR between adjacent nozzles 16 of a same collector 15 which is inversely proportional to the radius R.

In other words, at equal size of the nozzles 16, the distance of the latter along the collectors 15 results to be more and more close as the distance from the axis A of the conduct 12 increase.

In the alternative, homogeneous combustion conditions may also be obtained providing the nozzles 16 of varying size arranged along the perimeter of the collectors 15 at constant distance.

Advantageously, the nozzles 16 have a diameter comprised between 2 and 30 mm, preferably between 5 and 25 mm and even preferably between 5 and 15 mm.

The above mentioned dimensions of the nozzles 16 are particularly advantageous in that they allow to optimise the number and diameter of the nozzles that may be manufactured in the walls 17 of the collectors 15.

In doing so, a lot of low flow rate jets—and therefore a lot of short flames—are obtainable. That permit the combustion of high amounts of process gas in an extremely reduced space, without the risk that the flames lap onto the catalyst or onto the refractory lining of the combustion chamber 4.

In this way, undesired damages of the burner are avoided, as well as of the catalyst for the steam reforming reaction, to full advantage of the total yield of the secondary reforming apparatus. Further on, the fact that there is no more need of frequently replacing the burner—as in prior art—it results in huge savings in terms of costs since losses of production of synthesis gas and the maintenance costs are reduced.

In order to avoid undesired pressure drops of the flow comprising oxygen and steam passing through the collectors 15, the circular nozzles 16 are flared (countersunk) at an inner side 17' of the walls 17, as shown in FIG. 4.

Thanks to this expedient, it is possible to avoid a pressure drop even up to 50% with respect to the pressure drop to which the flow of oxygen would be subjected coming out of the nozzles 16, should these not be flared.

Such flaring is further advantageous in that it promotes an essentially laminar flow of the comburent gas through the nozzles 16. Thus avoiding the undesired formation of vortexes that would make the oxygen jets not constant and uniform with prejudice of a correct mixing between the reactant gases and with the risk of obtaining variations in the flames temperature and composition conditions.

Further on, the lower end 15a of the collectors 15 has preferably a substantially semicircular section for making the outflow of the gaseous flow comprising oxygen from the nozzles 16 easier, further minimising the pressure drop of such flow.

According to a further aspect of the present invention, suitable means are advantageously provided for rendering the flow rate of the gaseous flow comprising hydrocarbons coming out from the substantially annular hollow space 14 uniform.

According to the embodiment shown in FIGS. 2–4, the means for rendering uniform the process gas flow rate, comprises a plurality of perforated baffle plates 20 extending in the hollow space 14 nearby the collectors 15. More exactly, the baffle plates 20 extend perpendicular to the walls 17 and parallel to the respective lower end 15a of the collectors 15, in a position just above the nozzles 16.

Of course, it is also possible to provide only one baffle plate 20 depending upon the number and the shape of collectors 15.

The inlet nozzle 8 of the process gas being in general perpendicular to the hollow space 4 defined between the ducts 12 and 13, turbulence is formed in the gaseous flow comprising hydrocarbons flowing inside the hollow space 4. This turbulence causes the flow rate of the flow fed to the combustion chamber 4 to be not uniform.

As such flow is fed at short distance from the mixing zone with the oxygen, the absence of the perforated baffle plates 20—that guarantee an uniform distribution of the process gas—can lead to a non optimal mixing between the reactant gases, with velocity and therefore flow rate of the flow comprising hydrocarbons which can change locally and with time.

By rendering the flow rate of the gas flow comprising hydrocarbons directed into the combustion chamber 4 uniform, the amount of process gas entrained by any single oxygen jet coming out from the nozzles 16 is maintained constant and homogeneous in the proximity of the entire burner 6, further promoting a correct and complete combustion of hydrocarbons.

In other words, the gaseous flow comprising hydrocarbons fed to the combustion chamber 4 is advantageously subjected to a predetermined pressure drop when leaving the substantial annular passage defined by the hollow space 14, so as to uniform the flow rate of such flow.

As shown in FIG. 3, the opposite walls 17 of the collectors 15 are advantageously plane and substantially parallel to each other. Further on, such walls 17 extend from the end 12a of the first duct 12 with an angle preferably comprised between 30 and 60° with respect to the axis A of the duct 12.

In other words, the collectors 15 have a substantially parallelepiped shape in such a way to promote a passage of the comburent gas through the collectors 15 as laminar as possible and with minor pressure drops.

The specific angular orientation of the collectors 15 with respect to the axis A of the first duct 12 permits to confine the mixing zone of the gaseous reactants near an upper end of the combustion chamber 4 so as to exploit at most the available space for the combustion reaction.

Always to this end, the lower end 15a of the collectors 15 is advantageously rectilinear and is provided with a tilt angle comprised between 45° and 90° with respect to axis A, preferably between 60° and 80°, for instance 70°.

In order to limit at most the risk of damaging the refractory lining of the inner walls of the combustion chamber 4 by the flames generated by the oxygen jets coming out of the collectors 15 and at the same time to minimise the mechanical stresses to which the nozzles 16 are subjected, which cause a rapid wear thereof, the nozzles 16 have a tilt angle with respect to the walls 17 of the collectors 15 comprised between 90° and 10°, preferably 90° and 30°, for instance 45°.

According to a particularly preferred embodiment of the present invention, the end 12a of the first duct 12 has slots 21 for the passage of the gas flow comprising oxygen from the first duct 12 to the collectors 15. Advantageously, the total end area of the collectors 15 defined at such slots 21 is determined so as to be equal or greater than the passage area of the duct 12.

Thanks to the burner 6 according to the present invention, the comburent gas flows through the duct 12 and the collectors 15 with substantial axial motion, as shown by the dashed flow line 19 in FIG. 3, and feeds transversally with its entire flow rate all nozzles 16.

In doing so, the nozzles 16 are all fed by corresponding parallel streamtubes of the gaseous flow comprising oxygen having equal velocity, thus obtaining jets of uniform velocity and hence flames of equal length along the entire perimeter of the collectors 15.

This feature is not only advantageous in that it allows the achievement of an optimal and complete combustion in the combustion chamber 4, but above all because it does not cause significant pressure drop in the flow of the comburent gas during its passage from the duct 12 to the collectors 15. Moreover, this feature permits to realise in the end portion of the collectors 15 an extremely effective capillary cooling thus achieving a long operating life for the burner and hence relevant savings in term of loss of production of synthesis gas, maintenance costs and energy consumption.

In this respect, it shall be considered that thanks to the present invention, the comburent gas (that is cooler than the process gas) is maintained in contact (lap contact) in an uniform and continuous way with each part of the duct 12 and of the collectors 15, thus ensuring—always—an optimal cooling of such parts.

FIG. 3, clearly shows that the flows of the reactant gases flow into the burner 6 with a substantially axial motion (flow lines 18, 19). In particular, the oxygen flow is only subjected to a very small diverging deviation with respect to the axis A of the duct 12, thus minimizing the pressure drop.

Further on, the gaseous flow comprising oxygen advantageously flows perpendicular with respect to the end 15a of the collectors 15, uniformly distributing itself along the entire length of such end 15a. In doing so, it is possible to obtain an effective constant cooling also in this zone of the burner, that—being in direct contact with the hot burnt gases circulating inside the combustion chamber 4—is subjected to wear and thermal stresses to a greater extent.

It shall be noted that the end 12a of the first duct 12 has a truncated-conical (upside down) shape in order to promote the passage of the gas flow comprising oxygen from the duct 12 to the collectors 15, reducing at most possible pressure drops.

With the same purpose, the end 12a of the first duct 12 comprises inside it means for deviating the gas flow comprising oxygen toward the collectors 15.

Preferably such means comprises a conical-shaped deflector 22 whose vertex is foreseen near an upper portion of the end 12a of the first duct 12.

The pressure drops of the gas flow comprising oxygen flowing in the first duct 12 may be further reduced providing a semicircular shape for the vertex 23 of the conical-shaped deflector 22.

In FIGS. 2 and 3, a seal collar is indicated with 24, which is provided between the perforated baffle plates 20 and the duct 13, for minimising the direct passage of the process gas from the hollow space 14 to the combustion chamber 4.

Thanks to the burner 6 described with reference to FIGS. 1–4, it is advantageously possible to carry out the process according to the present invention for secondary reforming reactions described above and recited in the attached claims.

In particular, this process is distinguished by the fact of comprising the steps of feeding the gas flow comprising oxygen (flow line 19) in the combustion chamber 4 in the form of a plurality of jets not laid the one upon the other with respect to the direction of the flow comprising hydrocarbons (flow line 18) and generated by corresponding parallel streamtubes having equal velocity; splitting the plurality of jets within the gas flow comprising hydrocarbons in the combustion chamber 4 so as to mix the gas flow comprising oxygen with amounts of gas flow comprising hydrocarbons at local constant ratio.

Advantageously, the jets of the gas flow comprising oxygen may have a diameter at the outlet of the feeding duct of the burner 6 comprised between 2 and 30 mm, preferably between 2 and 25 mm, for instance 10 mm.

The small diameter of such jets allows to effectively control the length of the flames resulting from the combustion with the process gas, so as to obtain an optimal exploiting of the combustion chamber without the risk of damaging the refractory lining and/or the underlying catalyst.

Advantageously, the burner 6 according to the present invention further allows to carrying out the combustion reaction in the combustion chamber 4 by making the reactant gases to flow trough the duct 12 and the hollow space 14 at particularly low velocities. For instance velocities comprised between 20–200 m/s, preferably 40–100 m/s, for instance 50, 60 m/s. In doing so, the pressure drop of the gaseous flows is reduced and therefore subsequent energy dissipation is avoided, decreasing the energy consumption. Moreover, an optimal mixing of the gaseous flows in the chamber 4 is also ensured.

Finally, it is worth repeating that thanks to the present invention, the comburent gas coming out of the collectors 15 collides with the process gas flow in such a way that every single jet of oxygen entrains a same amount of process gas and, in case of transversal feed between the reactant gases, also an equal amount of burnt gases circulating inside the combustion chamber 4. In this way, an optimal mixing between the gases is obtained with flames equal to each other and having the same temperature and composition conditions, to full advantage of the combustion reaction.

From the above disclosure the various advantages achieved by the process according to the present invention appear clearly; in particular, it is possible to obtain a secondary reforming process, at high yields, easy to implement and adapted for providing a high production of synthesis gas at low energy consumption, low operating and maintenance costs, and with a substantial reduction of production losses—with respect to the processes according to the prior art—thanks to a resulting longer operating life and higher reliability of the burner operating according to the present process.

What is claimed is:

1. Process for secondary reforming comprising the steps of:
- feeding a gas flow comprising oxygen in a combustion chamber through a feeding duct of a burner;
- feeding a gas flow comprising hydrocarbons in said combustion chamber through a substantially annular passage defined externally to said feeding duct along a predetermined direction;
- mixing and reacting said gas flow comprising oxygen with said gas flow comprising hydrocarbons inside said combustion chamber, obtaining a gas flow comprising hydrogen and carbon monoxide;
- feeding said gas flow comprising hydrogen and carbon monoxide to a catalytic bed which lies below said combustion chamber for carrying out a steam reforming reaction; wherein the process comprises the steps of:
- feeding said gas flow comprising oxygen in said combustion chamber in the form of a plurality of jets generated by corresponding parallel streamtubes having equal velocity within the gas flow comprising hydrocarbons, the jets being spaced from each other; and
- mixing in said combustion chamber the gas flow comprising oxygen with amounts of gas flow comprising hydrocarbons at local constant ratio.

2. Process according to claim 1, wherein said gas flow comprising oxygen crosses with substantial transversal motion said gas flow comprising hydrocarbons in said combustion chamber.

3. Process according to claim 1, wherein the fact of subjecting said gas flow comprising oxygen flowing along said feeding duct to an overall pressure drop comprised between 0.25 and 2 bar.

4. Process according to claim 1, wherein said jets of the gas flow comprising oxygen are fed into said combustion chamber with a substantially orthogonal motion with respect to the motion of such flow inside said feeding duct.

5. Burner for secondary reforming of the type comprising:
- substantially cylindrical duct (12) of predetermined length for feeding a gas flow comprising oxygen to a combustion chamber (4) beneath the burner; wherein the burner further comprises:
- at least one collector (15) for said gas flow comprising oxygen radially protruding from an end (12a) of said duct (12) of the burner and in fluid communication therewith, comprising a plurality of nozzles (16) distributed along a perimeter of said at least one collector (15) near a lower end (15a) thereof and arranged spaced from each other.

6. Burner according to claim 5, wherein said nozzles (16) are arranged in said at least one collector (15) in only one row.

7. Burner according to claim 5, wherein said nozzles (16) have a diameter comprised between 2 and 30 mm, preferably between 5 and 25 mm.

8. Burner according to claim 5, wherein said nozzles (16) are flared at an inner side (17') of said at least one collector (15).

9. Burner according to claim 5, wherein said lower end (15a) of said at least one collector (15) has a substantially semicircular section.

10. Burner according to claim 5, wherein it comprises a plurality of said collectors (15) that extend radially from said end (12a) of said duct (12), said nozzles (16) being distributed along opposite walls (17) of said collectors (15).

11. Burner according to claim 10, wherein said nozzles (16) are circular and suitably spaced the one from the other, according to the following relationship:

$$Ni*Di^2/(Ri*DR)=C$$

wherein, C is a constant, Ri the radius, i-th circumference passing through the nozzles, Ni the number of nozzles on the circumference with radius Ri, Di the diameter of the nozzles on the circumference with radius Ri, and the radial distance $DR=(R_{i+1}-R_{i-1})/2$.

12. Burner according to claim 10, wherein the opposite walls (17) of said collectors (15) are plane and substantially parallel to each other and extend from said end (12a) of said duct (12) with an angle comprised between 30 and 60° with respect to the axis (A) of the duct (12).

13. Burner according to claim 12, wherein the lower end (15a) of said collectors (15) is substantially rectilinear and has a tilt angle comprised between 45 and 90° with respect to said axis (A).

14. Burner according to claim 12, wherein said nozzles (16) have a tilt angle with respect to said walls (17) comprised between 90 and 10°.

15. Burner according to claim 10, wherein said end (12a) of said duct (12) comprises inside it means (22) for deviating the gas flow comprising hydrocarbons towards said collectors (15).

16. Burner according to claim 15, wherein said means comprises a deflector (22) of conical shape whose vertex is provided near an upper portion of said end (12a) of the duct (12).

17. Apparatus for secondary reforming comprising
- a substantially cylindrical shell (2) that defines inside a combustion chamber (4) and wherein a catalytic bed (3) is arranged beneath said combustion chamber (4);
- inlet nozzles (8, 9) for a gas flow comprising hydrocarbons and a gas flow comprising oxygen, respectively, in fluid communication with said combustion chamber (4);
- an outlet nozzle (10) for a flow comprising synthesis gas in fluid communication with said catalytic bed (3);
- wherein the apparatus comprises a burner which is provided between said inlet nozzles (8, 9) and said combustion chamber (4).

* * * * *